(12) United States Patent
Hamada (10) Patent No.: US 8,934,720 B2
(45) Date of Patent: Jan. 13, 2015

(54) IMAGE PROCESSING DEVICE, IMAGE PROCESSING METHOD, AND INTEGRATED CIRCUIT IN WHICH SUPER RESOLUTION PROCESS DATA IS OUTPUT AS OUTPUT DATA FOR INPUT PIXEL DATA THAT IS CLASSIFIED AS HIGH-FREQUENCY REGION DATA AND THAT HAS NOISE LESS THAN OR EQUAL TO A THRESHOLD

(75) Inventor: Masao Hamada, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 196 days.

(21) Appl. No.: 13/639,047

(22) PCT Filed: Apr. 24, 2012

(86) PCT No.: PCT/JP2012/002787
§ 371 (c)(1),
(2), (4) Date: Oct. 2, 2012

(87) PCT Pub. No.: WO2012/176367
PCT Pub. Date: Dec. 27, 2012

(65) Prior Publication Data
US 2013/0101222 A1    Apr. 25, 2013

(30) Foreign Application Priority Data

Jun. 24, 2011  (JP) .................................. 2011-140355

(51) Int. Cl.
*G06K 9/46* (2006.01)
*G06T 3/40* (2006.01)
(Continued)

(52) U.S. Cl.
CPC ................ *G06T 3/4053* (2013.01); *G06K 9/46* (2013.01); *H04N 1/3871* (2013.01); *H04N 1/409* (2013.01); *H04N 5/21* (2013.01); *H04N 7/0117* (2013.01)
USPC ............................ 382/195; 348/607; 382/260

(58) Field of Classification Search
None
See application file for complete search history.

(56) References Cited

U.S. PATENT DOCUMENTS

2008/0112637 A1* 5/2008 Horie ............................ 382/260
2009/0135278 A1* 5/2009 Aragaki et al. ............... 348/242
(Continued)

FOREIGN PATENT DOCUMENTS

JP   7-152908    6/1995
JP   2008-182487  8/2008
(Continued)

OTHER PUBLICATIONS

International Search Report issued Jun. 12, 2012 in International (PCT) Application No. PCT/JP2012/002787.
(Continued)

*Primary Examiner* — Bhavesh Mehta
*Assistant Examiner* — Siamak Harandi
(74) *Attorney, Agent, or Firm* — Wenderoth, Lind & Ponack, L.L.P.

(57) ABSTRACT

An image processing device preventing the effect of noise from restricting the processing range of the super resolution process. The image processing device classifies each of a plurality of pieces of input pixel data that represent the input image into high-frequency region data or non-high-frequency region data, and generates, as at least part of output pixel data that represents the output image, one or more pieces of output pixel data in correspondence with one or more pieces of input pixel data classified as the high-frequency region data, by using the super resolution process data in accordance with amounts of noise of the one or more pieces of input pixel data.

8 Claims, 7 Drawing Sheets

(51) Int. Cl.
*H04N 1/387* (2006.01)
*H04N 1/409* (2006.01)
*H04N 5/21* (2006.01)
*H04N 7/01* (2006.01)

(56) References Cited

U.S. PATENT DOCUMENTS

2010/0027914 A1 2/2010 Terada et al.
2011/0267539 A1 11/2011 Terada et al.

FOREIGN PATENT DOCUMENTS

| JP | 2009-25862 | 2/2009 |
| JP | 2010-41337 | 2/2010 |

OTHER PUBLICATIONS

Takashi Imada, "Clear Image Enhancement Technology for Large Screen TV", Toshiba review, vol. 64, No. 2, (2009), pp. 56-57 along with English translation.

Nao Mishima et al., "Advanced Super-Resolution Technologies of CELL REGZA$_{TM}$", Toshiba review, vol. 65, No. 4, (2010), pp. 15-18 along with English translation.

S. Park et al., "Super-Resolution Image Reconstruction: A Technical Overview", IEEE Signal Processing Magazine, May 2003, vol. 20, Issue 3, pp. 21-36.

"Beyond Super Resolution, Toshiba Technology/Liquid crystal TV/ REGZA: Toshiba", Toshiba web page (retrieved on Jul. 26, 2012) along with English translation.

* cited by examiner

| | Amount of noise ≤ threshold | Amount of noise > threshold |
|---|---|---|
| Low-frequency region | Super resolution process or filter process | Super resolution process or filter process |
| Middle-frequency region | Super resolution process | Super resolution process |
| High-frequency region | Super resolution process | Filter process |

IMAGE PROCESSING DEVICE, IMAGE PROCESSING METHOD, AND INTEGRATED CIRCUIT IN WHICH SUPER RESOLUTION PROCESS DATA IS OUTPUT AS OUTPUT DATA FOR INPUT PIXEL DATA THAT IS CLASSIFIED AS HIGH-FREQUENCY REGION DATA AND THAT HAS NOISE LESS THAN OR EQUAL TO A THRESHOLD

TECHNICAL FIELD

The present invention relates to an image processing technology for outputting images having passed through the super resolution process.

BACKGROUND ART

In recent years, full HD (High Definition) video contents have become increasingly popular, and chances of viewing video images on a display having a full HD resolution have increased. Note that the full HD indicates a video image made up of 1920×1080 pixels.

When a low-resolution video image recorded on a DVD or the like is viewed on a full-HD display, an enlargement process needs to be performed to convert the video image to high resolution. However, the conversion of images from low resolution to high resolution has a problem that the images are blurred by the enlargement process.

As the process for sharpening images as a solution to the above problem, an edge enhancement filter process and a super resolution process are known. Note that the super resolution process mentioned here is a process for correcting details of images with such a precision that cannot be obtained by the edge enhancement filter process (for example, see Non-Patent Literatures 1, 2 and 3).

Meanwhile, some super resolution processes perform the correction process in units of pixels. In that case, when a process-target pixel includes noise, even the noise may be sharpened (enhanced).

In general, a video content is recorded onto a recording medium after it is encoded. A so-called encoding noise occurs during the encoding/decoding process. Such a noise often occurs in a high-frequency region (peripheral of an edge part) in images constituting a video image.

In view of the above, a method in which the edge enhancement filter process instead of the super resolution process is performed on the high-frequency region has been proposed (see, for example, Non-Patent Literature 4).

Another proposed method is a combined filter process for performing a combined process of a noise removal filter process and the edge enhancement filter process to restrict the influence of the above-described noise (see, for example, Patent Literature 1).

Note that there is also proposed a method for measuring the amount of noise and changing the noise removal level value of the noise removal filter to increase the noise removal efficiency (see, for example, Patent Literature 2).

CITATION LIST

Patent Literature

[Patent Literature 1]
    Japanese Patent Application Publication No. 7-152908
[Patent Literature 2]
    Japanese Patent Application Publication No. 2008-182487

Non-Patent Literature

[Non-Patent Literature 1]
    Takashi Imada, "Image Enhancement Technology for Large Screen Display Era", Toshiba Review, 2009, Vol. 64, No. 2
[Non-Patent Literature 2]
    Nao Mishima, Himio Yamauchi, "Advanced Super-Resolution Technologies of CELL REGZA™", Toshiba Review, 2010, Vol. 65, No. 4
[Non-Patent Literature 3]
    S. Park, M. Park, M. Kang, "Super-Resolution Image Reconstruction: A Technical Overview", IEEE Signal Processing Magazine, 2003, Vol. 20, Issue 3, Pages 21-36
[Non-Patent Literature 4]
    Toshiba WEB page, "Technical Power of Toshiba, Exceeding High Resolution", [online], [searched Apr. 1, 2011], Internet <URL: http://www.toshiba.co.jp/regza/detail/superresolution/technology.html>

SUMMARY OF INVENTION

Technical Problem

However, when the above-described noise removal process is performed, the effect of the super resolution process is reduced. Also, as described above, there is a possibility that the noise may be enhanced by the super resolution process. As a result, the image quality may be decreased when the super resolution process is performed on the high-frequency region in which noise occurs.

It is therefore an object of the present invention to provide an image processing device for obtaining higher-quality images, with the super resolution process being performed on the high-frequency region as well.

Solution to Problem

The above object is fulfilled by an image processing device for generating an output image by performing an image process on an input image, the image processing device comprising: a super resolution processing unit configured to generate super resolution process data by performing a super resolution process on a plurality of pieces of input pixel data that represent the input image; a region determining unit configured to classify each of the plurality of pieces of input pixel data into one of high-frequency region data and non-high-frequency region data; and a generating unit configured to generate, as at least part of output pixel data that represents the output image, one or more pieces of output pixel data in correspondence with one or more pieces of input pixel data classified as the high-frequency region data, by using the super resolution process data in accordance with amounts of noise of the one or more pieces of input pixel data.

Advantageous Effects of Invention

With the above-described structure, a high image quality provided by the super resolution process can be used without influence of noise, even with regard to the high-frequency region.

DESCRIPTION OF EMBODIMENTS

Embodiment 1

Figure 1:
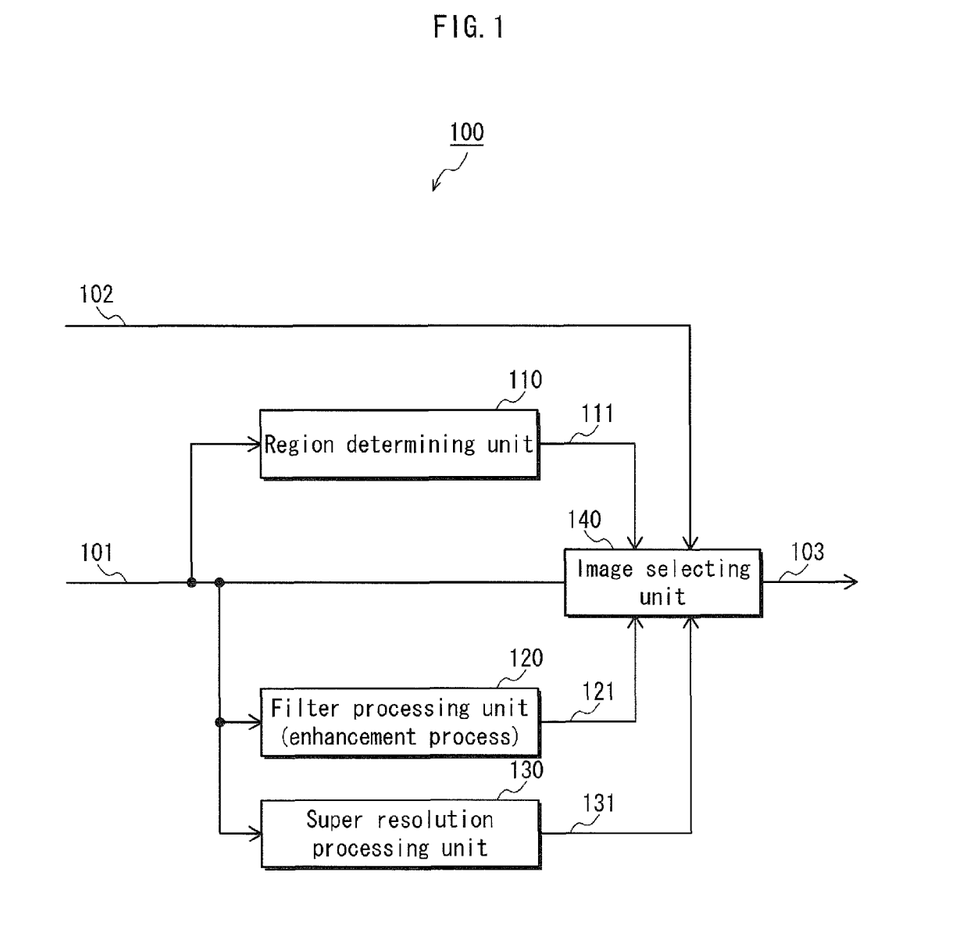
FIG. 1 is a block diagram illustrating an example of the structure of the image processing device 100 in Embodiment 1.

The following describes an image processing device 100 as one embodiment of the present invention, with reference to the attached drawings.
<Structure>
FIG. 1 is a block diagram illustrating the structure of the image processing device 100 as one embodiment of the present invention. As illustrated in FIG. 1, the image processing device 100, including a region determining unit 110, a filter processing unit 120, a super resolution processing unit 130, and an image selecting unit 140, inputs input image data 101 and noise information data 102, and outputs output image data 103.

The input image data 101 includes (i) high-resolution image data which is data of a high-resolution image resulted from the enlargement process performed on a low-resolution image, and (ii) positional information indicating positions of processing-target pixels in an image (frame). Note that the processing-target pixels are pixels on which the processes are to be performed by the region determining unit 110, the filter processing unit 120 and the super resolution processing unit 130.

The noise information data 102 indicates amounts of the noises that are respectively included in the pixels of the high-resolution image data. The amounts of noise indicated by the noise information data 102 to be input to the image processing device 100 are estimated in advance by using the data compression rate and quantization coefficient that are used when the original data of the input image data 101 is encoded.

The region determining unit 110 detects the processing-target pixels based on the positional information included in the input image data 101, refers to pixel values of the processing-target pixels (input pixel data) and pixel values of peripheral pixels of the processing-target pixels (peripheral pixel data), determines which of a high-frequency region, a middle-frequency region and a low-frequency region each of the processing-target pixels belongs to, and outputs region determination data 111 that varies depending on the determined region, wherein the high-frequency region is a region in which the processing-target pixels have a great change in brightness, the middle-frequency region is a region in which the processing-target pixels have a small change in brightness, and the low-frequency region is a region in which the processing-target pixels have almost no change in brightness. As one example of a method used to determine the region as described above, a spectral analysis associated with a frequency conversion may be performed, and two thresholds taken from maximum frequency components included in the pixels may be used. As another example of the region determination method, a predetermined frequency may be extracted for the determination by using a filter such as a high-pass filter, low-pass filter or bandpass filter.

Note that the high-frequency region, middle-frequency region and low-frequency region may also be called an edge part, texture part and flat part, respectively.

The filter processing unit 120 performs a noise removal process and a filter process for enhancement of the edge on the input pixel data and the peripheral pixel data thereof, and outputs filter process data 121 having an enhanced edge.

The super resolution processing unit 130 performs a super resolution process on the input image data 101, and outputs super resolution data 131 that is obtained as a result of the super resolution process. Note that, for the super resolution process, it is possible to use a known technology such as the color super resolution or the super resolution in which the self-congruency of images disclosed in Non-Patent Literature 1 is used.

The image selecting unit 140 selects output pixel data, which constitutes the output image data 103, from the pixel values of the processing-target pixels in the input image data 101 (input pixel data), the filter process data 121 and the super resolution data 131, and outputs the selected output pixel data.

Figure 2:
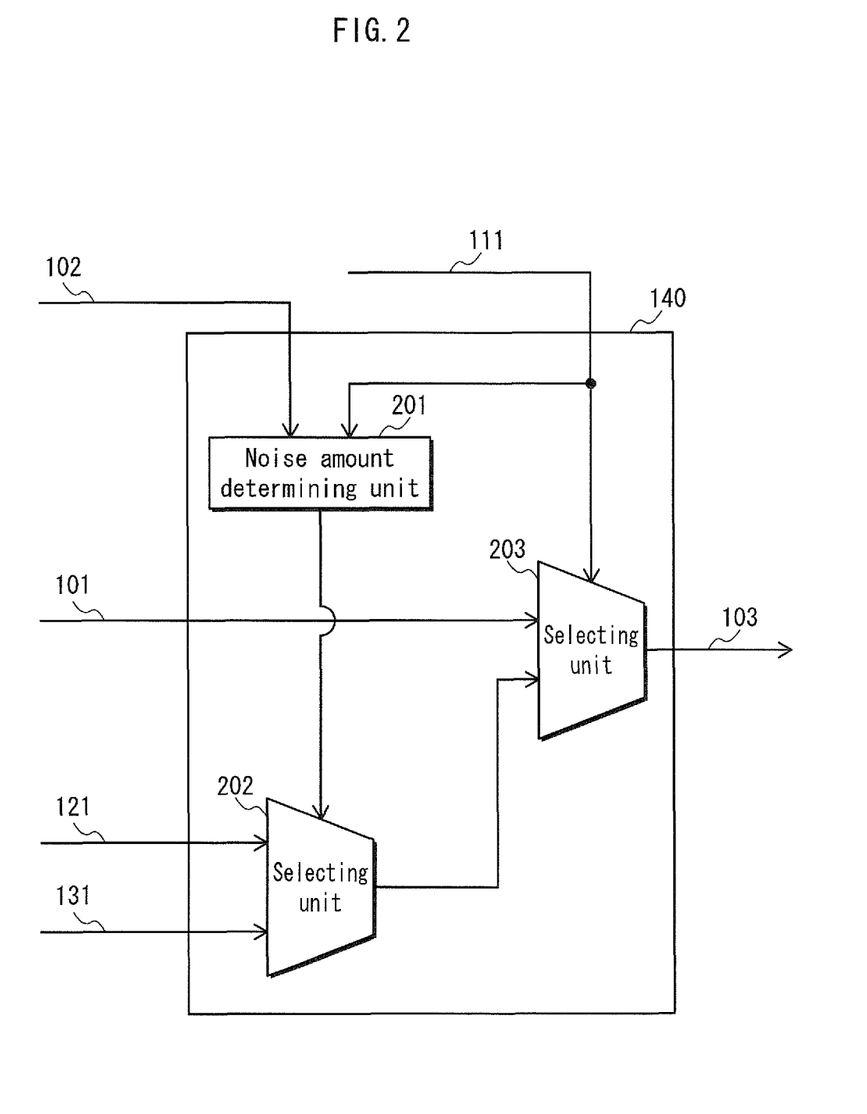
FIG. 2 is a block diagram illustrating an example of the structure of the image selecting unit 140 in Embodiment 1.

FIG. 2 is a block diagram illustrating the structure of the image selecting unit 140. As illustrated in FIG. 2, the image selecting unit 140 includes a noise amount determining unit 201, a selecting unit 202 and a selecting unit 203.

The noise amount determining unit 201 generates a signal for the selecting unit 202 to select the filter process data 121 or the super resolution data 131, based on the amount of noise indicated by the noise information data 102 and the region determination data 111. When the region determination data 111 indicates the high-frequency region, the noise amount determining unit 201 generates the signal based on the amount of noise. When the amount of noise indicated by the noise information data 102 is small, the noise amount determining unit 201 generates a signal for the selecting unit 202 to select the super resolution data 131 for the sake of a high-quality image, and when the amount of noise indicated by the noise information data 102 is large, the noise amount determining unit 201 generates a signal for the selecting unit 202 to select the filter process data 121 to avoid enhancement of noise.

Figure 3:
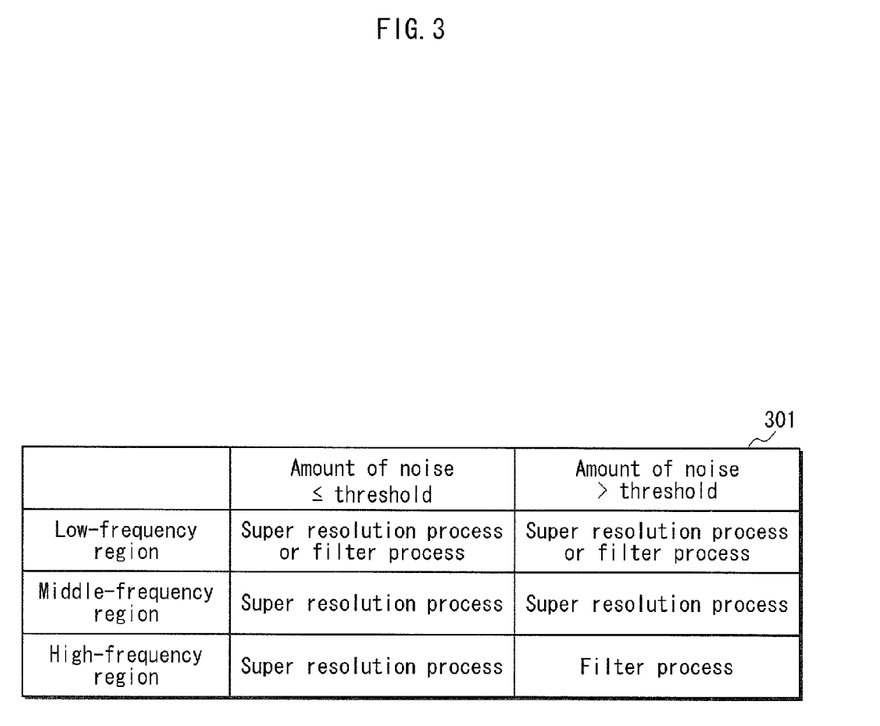
FIG. 3 illustrates an example of determination by the noise amount determining unit 201 in Embodiment 1.

FIG. 3 illustrates an example of determination by the noise amount determining unit 201. The noise amount determining unit 201 generates a signal for selecting the filter process data 121 when the region determination data 111 indicates the high-frequency region and the amount of noise indicated by the noise information data 102 is larger than a predetermined threshold; and generates a signal for selecting the super resolution data 131 when the region determination data 111 indicates the high-frequency region and the amount of noise indicated by the noise information data 102 is equal to or smaller than the predetermined threshold. Also, the noise amount determining unit 201 generates a signal for selecting the super resolution data 131 when the region determination data 111 indicates the middle-frequency region; and generates a signal for selecting either the filter process data 121 or the super resolution data 131 when the region determination data 111 indicates the low-frequency region, wherein which of the filter process data 121 and the super resolution data 131 is to be selected is set in advance.

The selecting unit 202 selects either the filter process data 121 or the super resolution data 131 in accordance with the signal generated by the noise amount determining unit 201, and outputs the selected data.

The selecting unit 203, in accordance with the signal indicating the region determination data 111, outputs the input pixel data as the output pixel data when the region determination data 111 indicates the low-frequency region. When the region determination data 111 indicates the middle-frequency region or the high-frequency region, the selecting unit 203 waits for the output of the selecting unit 202, and outputs the output of the selecting unit 202 as the output pixel data.

Note that the structural elements: the region determining unit 110, filter processing unit 120, super resolution processing unit 130, and image selecting unit 140 are realized when the CPU runs a program stored in a RAM or the like.

<Operation>

Next, the operation of the present embodiment is described with reference to the flowchart illustrated in FIG. 4.

Figure 4:
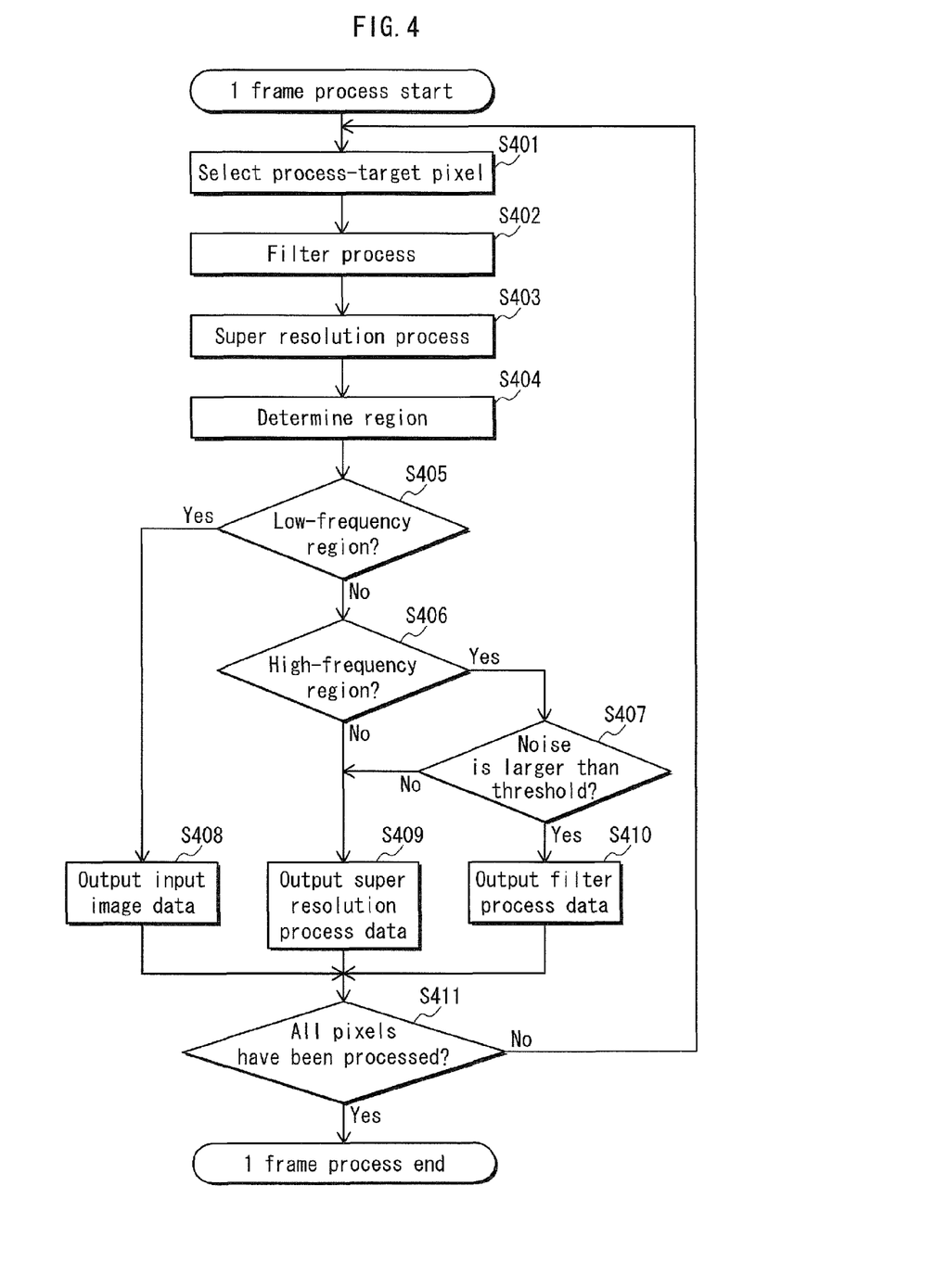
FIG. 4 is a flowchart illustrating an example of the operation of the image processing device 100 in Embodiment 1.

As illustrated in FIG. 4, when the frame process is started, the image processing device 100 first selects a process-target pixel from the input image data 101 and the noise information data 102 (step S401). In this example, the image processing device 100 selects a pixel from the input image data 101 by the raster scan method.

The filter processing unit 120 outputs filter process data 121 which is obtained by performing the filter process on the input pixel data (step S402). The super resolution processing unit 130 outputs super resolution data 131 which is obtained by performing the super resolution process to the input pixel data (step S403).

Subsequently, the region determining unit 110 performs a region determination process to determine which of the high-frequency region, middle-frequency region and low-frequency region each of the processing-target pixels of the input image data 101 belongs to (step S404).

When the region determination data 111 indicates the low-frequency region (YES in step S405), the selecting unit 203 outputs the input pixel data as the output pixel data regardless of the results of the processes performed by the noise amount determining unit 201 and selecting unit 202 (step S408).

When the region determination data 111 indicates the middle-frequency region (NO in both steps S405 and S406), the noise amount determining unit 201 outputs a signal for selecting the super resolution data 131, the selecting unit 202 outputs the super resolution data 131 in accordance with the signal generated by the noise amount determining unit 201, and the selecting unit 203 outputs the super resolution data 131 output from the selecting unit 202, as the output pixel data (step S409).

When the region determination data 111 indicates the high-frequency region (NO in step S405; and YES in step S406), a comparison is made between a predetermined threshold and the amount of noise indicated by the noise information data 102 (step S407).

When the amount of noise is equal to or smaller than the predetermined threshold (NO in step S407), the noise amount determining unit 201 outputs a signal for selecting the super resolution data 131, the selecting unit 202 outputs the super resolution data 131 in accordance with the signal generated by the noise amount determining unit 201, and the selecting unit 203 outputs the super resolution data 131 output from the selecting unit 202, as the output pixel data (step S409).

When the amount of noise is larger than the predetermined threshold (YES in step S407), the noise amount determining unit 201 outputs a signal for selecting the filter process data 121, the selecting unit 202 outputs the filter process data 121 in accordance with the signal generated by the noise amount determining unit 201, and the selecting unit 203 outputs the filter process data 121 output from the selecting unit 202, as the output pixel data (step S410).

The image processing device 100 judges whether or not all pixels of the input image data 101 have been processed (step S411). When it is judged that there is a pixel that has not been processed (NO in step S411), the control returns to step S401 again, and when it is judged that all pixels have been processed (YES in step S411), the frame process is ended.

Embodiment 2

The following describes an image processing device as another embodiment of the present invention. In Embodiment 1, in each pixel process, output pixel data is generated by selecting one from among a plurality of image process results. In contrast, in Embodiment 2, output pixel data is generated by mixing a plurality of image process results. Note that, in Embodiment 2, structural elements and data that are the same as those of Embodiment 1 are assigned the same reference signs and description thereof is omitted.

<Structure>

Figure 5:
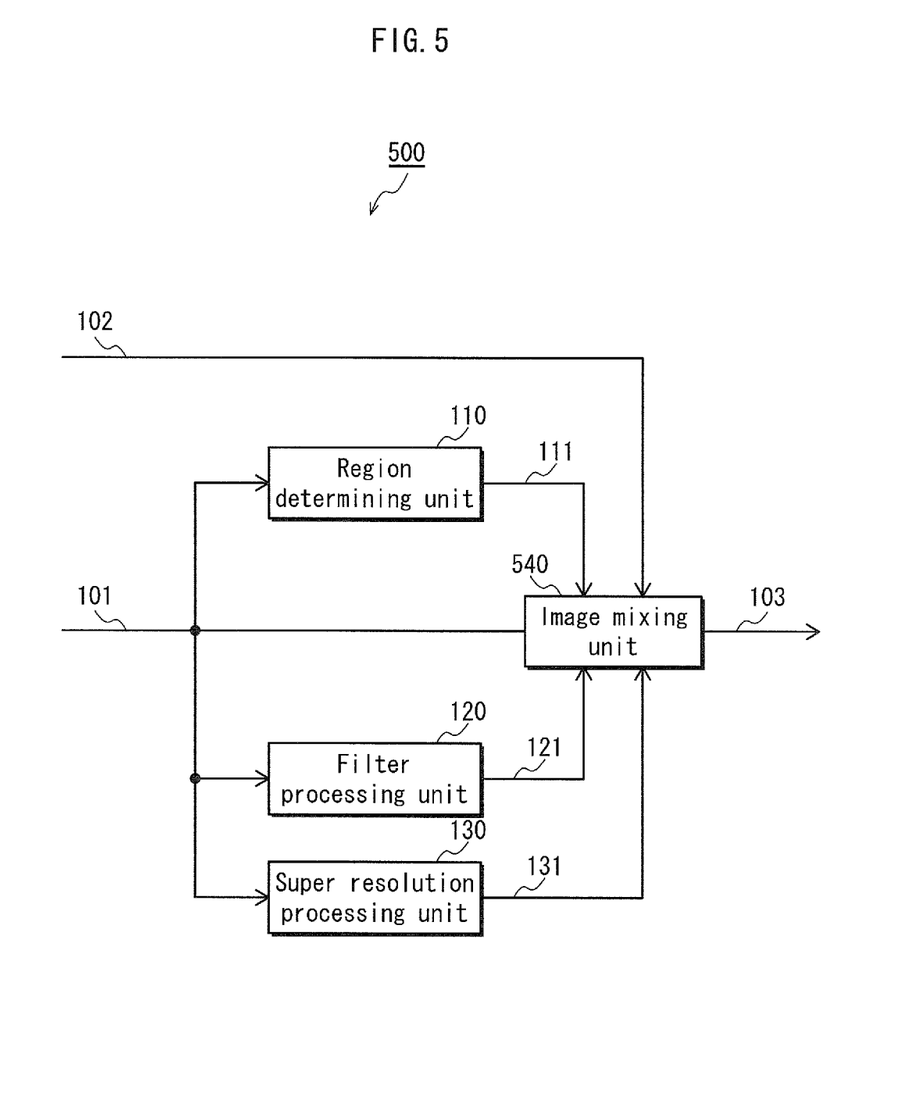
FIG. 5 is a block diagram illustrating an example of the structure of the image processing device 500 in Embodiment 2.

FIG. 5 is a block diagram illustrating the structure of an image processing device 500. As illustrated in FIG. 5, the image processing device 500 differs from the image processing device in Embodiment 1 in that it includes an image mixing unit 540 instead of the image selecting unit 140.

The image mixing unit 540 mixes the input pixel data, filter process data 121 and super resolution data 131 based on an assumed amount of noise indicated by the noise information data 102 and the region determination data 111, and outputs the mixture data.

Figure 6:
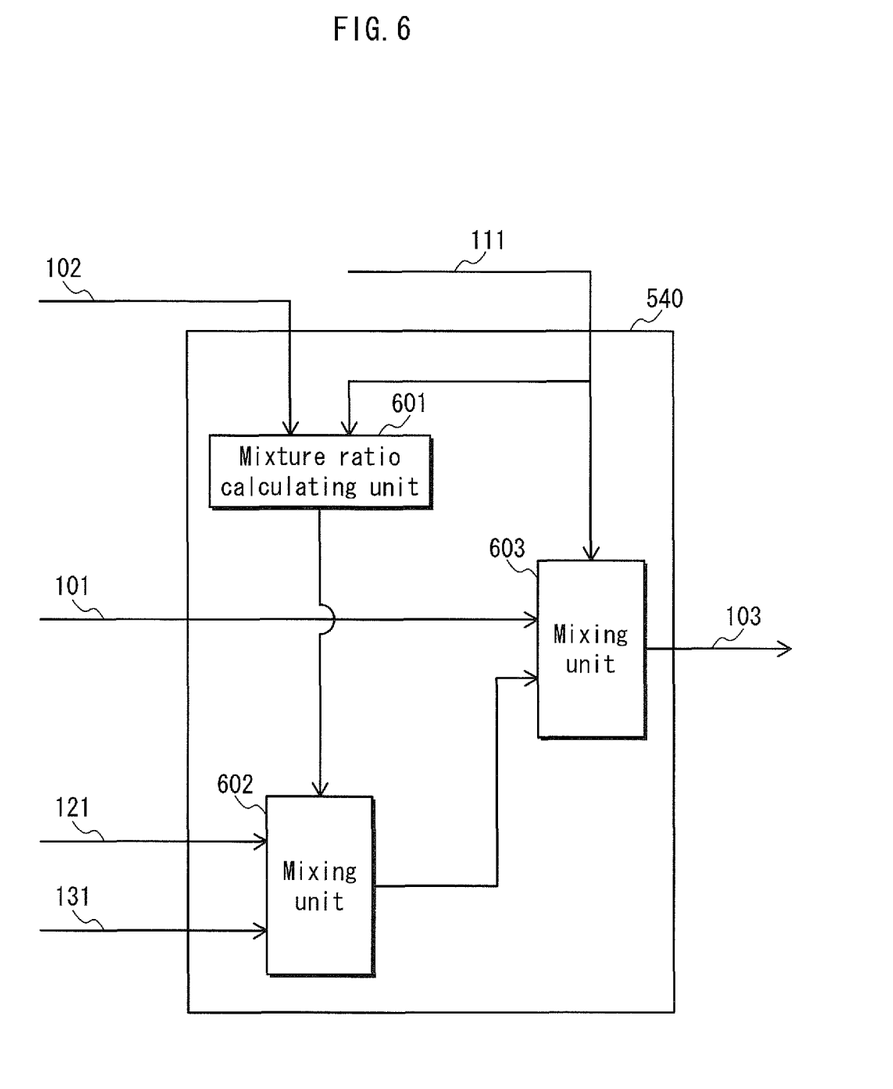
FIG. 6 is a block diagram illustrating an example of the structure of the image mixing unit 540 in Embodiment 2.

FIG. 6 is a block diagram illustrating the structure of the image mixing unit 540. As illustrated in FIG. 6, the image mixing unit 540 includes a mixture ratio calculating unit 601, a mixing unit 602, and a mixing unit 603.

The mixture ratio calculating unit 601 calculates a mixture ratio $\alpha$: $(1-\alpha)$ for mixing the filter process data 121 with the super resolution data 131 based on the amount of noise indicated by the noise information data 102 and the region determination data 111, and outputs the calculated mixture ratio. The mixture ratio $\alpha$: $(1-\alpha)$ is set such that when the region determination data 111 indicates the high-frequency region, the value of a increases as the amount of noise increases, and the mixture ratio of the filter process data 121 increases to prevent the enhancement of noise by the super resolution process. Note that the mixture ratio satisfies $0 \leq \alpha \leq 1$.

In the present embodiment, the mixture ratio $\alpha$: $(1-\alpha)$ is calculated by using a function "$\alpha = CLIP(1.0, M/N)$, where N denotes a predetermined amount of noise that has been set in advance, and M denotes the amount of noise indicated by the noise information data 102. The CLIP function means that: if $(M/N) \leq 1.0$, then $\alpha = M/N$; and if $(M/N) > 1.0$, then $\alpha = 1.0$. Note that when the region determination data 111 indicates the middle-frequency region, $\alpha = 0.0$ is satisfied.

The mixing unit 602 mixes the filter process data 121 with the super resolution data 131 based on the mixture ratio $\alpha$: $(1-\alpha)$ output from the mixture ratio calculating unit 601, and outputs mixture pixel data that is obtained as a result of the mixture.

The mixing unit 603 outputs output pixel data that is generated by mixing the input pixel data with the mixture pixel data output from the mixing unit 602, based on a mixture ratio $\beta$: $(1-\beta)$. Note that, when the region determination data 111 indicates the low-frequency region, the input pixel data is output as it is, where $\beta = 1.0$. Also, when the region determination data 111 indicates the middle-frequency region or the high-frequency region, the process by the mixing unit 603 is started after the process by the mixing unit 602 is completed.

Note that the value of $\beta$ is used to determine the mixture ratio of the input pixel data to the mixture pixel data and adjust the effect of the image processing performed by the image processing device 500, and the value of β is set based on the user's preference.

<Operation>

The operation of the present embodiment is described with reference to the flowchart illustrated in FIG. 7.

Figure 7:
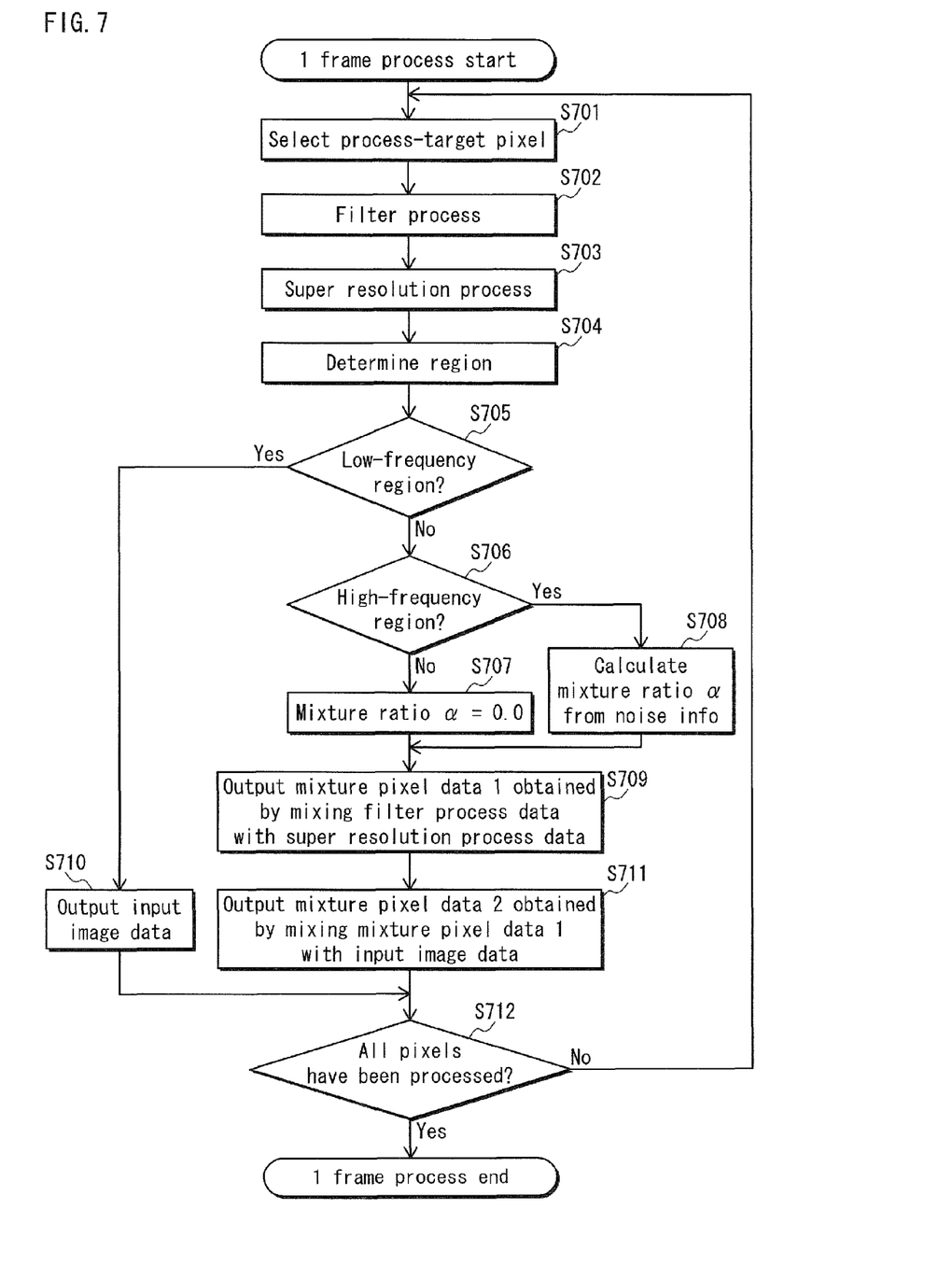
FIG. 7 is a flowchart illustrating an example of the operation of the image processing device 500 in Embodiment 2.

As illustrated in FIG. 7, when the frame process is started, the image processing device 500 first selects a process-target pixel from the input image data 101 and the noise information data 102 (step S701). In this example, the image processing device 500 selects a pixel from the input image data 101 by the raster scan method.

The filter processing unit 120 outputs filter process data 121 which is obtained by performing the filter process on the input pixel data (step S702). The super resolution processing unit 130 outputs super resolution data 131 which is obtained by performing the super resolution process to the input pixel data (step S703).

Subsequently, the region determining unit 110 performs a region determination process to determine which of the high-frequency region, middle-frequency region and low-frequency region each of the processing-target pixels in the input image data 101 belongs to (step S704).

When the region determination data 111 indicates the low-frequency region (YES in step S705), the mixing unit 603 outputs mixture data in which the mixture ratio of the input pixel data to the mixture pixel data is 1:0, namely outputs the input pixel data as the output pixel data, regardless of the results of the processes performed by the mixture ratio calculating unit 601 and the mixing unit 602 (step S710).

When the region determination data 111 indicates the middle-frequency region (NO in both steps S705 and S706), the mixture ratio calculating unit 601 sets the mixture ratio α: (1−α), namely the mixture ratio of the filter process data 121 to the super resolution data 131, to α=0.0, and outputs the mixture ratio (step S707).

When the region determination data 111 indicates the high-frequency region (NO in step S705; and YES in step S706), the mixture ratio calculating unit 601 calculates the mixture ratio α: (1−α), namely the mixture ratio of the filter process data 121 to the super resolution data 131, and outputs the value of α (step S708).

When the region determination data 111 indicates the middle-frequency region or the high-frequency region, the mixing unit 602 outputs mixture pixel data that is obtained as a result of mixing the filter process data 121 with the super resolution data 131 based on the mixture ratio α: (1−α) output from the mixture ratio calculating unit 601 (step S709).

When the region determination data 111 indicates the middle-frequency region or the high-frequency region, the mixing unit 603 outputs output pixel data that is generated by mixing the input pixel data with the mixture pixel data based on the mixture ratio β:(1−β) that has been set in advance (step S711).

The image processing device 500 judges whether or not all pixels of the input image data 101 have been processed (step S712). When it is judged that there is a pixel that has not been processed (NO in step S712), the control returns to step S701 again, and when it is judged that all pixels have been processed (YES in step S712), the frame process is ended.

<Supplementary Note 1>

Up to now, the present invention has been described through embodiments. However, the present invention is not limited to these embodiments. The following explains various modifications included in the concept of the present invention.

(1) In Embodiments 1 and 2, the input image data 101 is high-resolution image data which is data of a high-resolution image resulted from the enlargement process performed on a low-resolution image, and the input image data 101 includes pixel values of processing-target pixels and positional information indicating positions of the processing-target pixels in a frame. However, the input image data 101 may be image data that has not passed through the enlargement process. That is to say, image data that has not passed through the enhancement process may be input so that the image data is sharpened.

(2) In Embodiments 1 and 2, the input image data 101 is high-resolution image data which is data of a high-resolution image resulted from the enlargement process performed on a low-resolution image, and the input image data 101 includes pixel values of processing-target pixels and positional information indicating positions of the processing-target pixels in a frame. However, an enlargement processing unit may be added as a structural element of the image processing device, and the enlargement process may be performed in the image processing device 100.

(3) In Embodiments 1 and 2, the noise information data 102 indicates assumed amounts of encoding noise. However, the present invention is not limited to this structure. For example, when the image processing device is an imaging device, the noise information data 102 may indicate assumed amounts of optical noise. The amounts of optical noise of pixels can be assumed from the property of the sensor of the imaging device and the brightness value of the image by using a probabilistic distribution.

(4) In Embodiments 1 and 2, the region determining unit 110 performs a spectral analysis associated with a frequency conversion to determine the region. However, not limited to this, the region may be determined based on the difference in brightness value between the target pixels and the peripheral pixels thereof, as an easier method.

(5) In Embodiment 2, the mixture ratio calculating unit 601 calculates the mixture ratio α by using a CLIP function. However, not limited to this, the method for calculating the mixture ratio α may be any method in so far as it results in that the mixture ratio of the filter process data 121 increases as the amount of noise increases. The mixture ratio may be calculated by using a monotonically increasing function specifying the amount of noise as a variable, instead of the CLIP function. Alternatively, a value that corresponds to the region determination data 111 and the amount of noise may be detected by referring to a mixture ratio table and the detected value may be output.

(6) The above embodiments and modifications may be partially combined.

(7) A control program, which is composed of program code written in a machine language or a high-level language for causing a processor of the image processing device and various circuits connected to the processor to execute the processes (filter process, super resolution process, etc.) described in Embodiments 1 and 2, may be recorded on a recording medium, or distributed via various communication paths or the like. Such recording mediums include IC card, hard disk, optical disc, flexible disk, ROM, flash memory and so on. A distributed control program may be stored in a memory or the like so that it can be read by a processor, and the functions described in the above embodiments may be realized when the processor executes the control program. Note that the control program may be executed directly by the processor, or may be executed after it is compiled, or may be executed by an interpreter.

(8) The structural elements (the filter processing unit, super resolution processing unit and the like) for performing respective functions may be realized as circuits for executing the functions, or may be realized by causing one or more processors to execute a program. Each image processing device described in Embodiments 1 and 2 may be realized as a package of an integrated circuit which is IC, LSI or the like. The package is may be embedded in various types of devices for use so that the various types of devices can realize the functions described in the above embodiments.

Note that, typically, the functional blocks (the filter processing unit, super resolution processing unit and the like) are realized as LSIs that are integrated circuits. Each of the functional blocks may be realized on one chip, or part or all of the functional blocks may be realized on one chip. Although the term LSI is used here, it may be called IC, system LSI, super LSI, ultra LSI or the like, depending on the level of integration. Also, the method of realizing the integrated circuits is not limited to the LSI, but they may be realized by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI. Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

<Supplementary Note 2>

The following describes one embodiment of the present invention and effects thereof.

(1) An image processing device in one embodiment of the present invention is an image processing device for generating an output image by performing an image process on an input image, the image processing device comprising: a super resolution processing unit configured to generate super resolution process data by performing a super resolution process on a plurality of pieces of input pixel data that represent the input image; a region determining unit configured to classify each of the plurality of pieces of input pixel data into one of high-frequency region data and non-high-frequency region data; and a generating unit configured to generate, as at least part of output pixel data that represents the output image, one or more pieces of output pixel data in correspondence with one or more pieces of input pixel data classified as the high-frequency region data, by using the super resolution process data in accordance with amounts of noise of the one or more pieces of input pixel data.

Also, an image processing method in one embodiment of the present invention is an image processing method for generating an output image by performing an image process on an input image, the image processing method comprising the steps of: generating super resolution process data by performing a super resolution process on a plurality of pieces of input pixel data that represent the input image; classifying each of the plurality of pieces of input pixel data into one of high-frequency region data and non-high-frequency region data; and generating, as at least part of output pixel data that represents the output image, one or more pieces of output pixel data in correspondence with one or more pieces of input pixel data classified as the high-frequency region data, by using the super resolution process data in accordance with amounts of noise of the one or more pieces of input pixel data.

Also, an integrated circuit in one embodiment of the present invention is an integrated circuit for use in an image processing device for generating an output image by performing an image process on an input image, the integrated circuit comprising: a super resolution processing unit configured to generate super resolution process data by performing a super resolution process on a plurality of pieces of input pixel data that represent the input image; a region determining unit configured to classify each of the plurality of pieces of input pixel data into one of high-frequency region data and non-high-frequency region data; and a generating unit configured to generate, as at least part of output pixel data that represents the output image, one or more pieces of output pixel data in correspondence with one or more pieces of input pixel data classified as the high-frequency region data, by using the super resolution process data in accordance with amounts of noise of the one or more pieces of input pixel data.

Also, a program one embodiment of the present invention is a program that is recorded on a computer-readable non-transitory recording medium and executes an image process, the image process comprising the steps of: generating super resolution process data by performing a super resolution process on a plurality of pieces of input pixel data that represent the input image; classifying each of the plurality of pieces of input pixel data into one of high-frequency region data and non-high-frequency region data; and generating, as at least part of output pixel data that represents the output image, one or more pieces of output pixel data in correspondence with one or more pieces of input pixel data classified as the high-frequency region data, by using the super resolution process data in accordance with amounts of noise of the one or more pieces of input pixel data.

With the above-described structure, a high image quality provided by the super resolution process can be used without influence of noise, even with regard to the high-frequency region, and thus it is possible to obtain an output image that is sharper than conventionally obtained output images.

(2) In the image processing device of above (1), when an amount of noise included in a piece of input pixel data classified as the high-frequency region data is smaller than a predetermined threshold, the generating unit may output a piece of super resolution process data corresponding to the piece of input pixel data without change as a piece of output pixel data corresponding to the piece of input pixel data.

(3) The image processing device of above (1) may further comprise a filter processing unit configured to generate filter process data by applying a filter process to the plurality of pieces of input pixel data, the generating unit may include a first mixing unit configured to generate one or more pieces of first mixture data by mixing the super resolution process data with the filter process data in accordance with the amounts of noise of the one or more pieces of input pixel data, wherein the generating unit outputs the one or more pieces of first mixture data as the one or more pieces of output pixel data.

(4) In the image processing device of above (3), the first mixing unit may calculate a mixture ratio $\alpha: (1-\alpha)$ satisfying $0 \leq \alpha \leq 1$ such that a value of a increases as the amount of noise increases, and generate the one or more pieces of first mixture data by mixing the filter process data with the super resolution process data in accordance with the mixture ratio $\alpha: (1-\alpha)$.

With the above-described structure of (3) and (4), a high image quality provided by the super resolution process can be used even with regard to the high-frequency region, and it is possible to restrict the enhancement of noise by mixing the filter process data in accordance with the amount of noise.

(5) In the image processing device of above (3), the generating unit may further include a second mixing unit configured to generate one or more pieces of second mixture data by mixing the one or more pieces of input pixel data with the one or more pieces of first mixture data in accordance with a predetermined mixture ratio, and the generating unit may output the one or more pieces of second mixture data instead of the one or more pieces of first mixture data.

With the above-described structure of (5), image data that has passed through the image process is mixed with image data that has not passed through the image process, which makes it possible to reduce the effect of the image process, and the mixture ratio is adjusted, which makes it possible to adjust the effect of the image process.

INDUSTRIAL APPLICABILITY

The image processing device of the present invention can be used as a video image display device, an image playback device, an imaging device and the like.

REFERENCE SIGNS LIST 100, 500 image processing device
101 input image data
102 noise information data
103 output image data
110 region determining unit
111 region determination data
120 filter processing unit
121 filter process data
130 super resolution processing unit
131 super resolution data
140 image selecting unit
540 image mixing unit
201 noise amount determining unit
202, 203 selecting unit
601 mixture ratio calculating unit
602, 603 mixing unit

The invention claimed is:

1. An image processing device for generating an output image by performing an image process on an input image, the image processing device comprising:
    a super resolution processing unit configured to generate super resolution process data by performing a super resolution process on a plurality of pieces of input pixel data that represent the input image;
    a region determining unit configured to classify each of the plurality of pieces of input pixel data into one of high-frequency region data and non-high-frequency region data; and
    a generating unit configured to generate, as at least part of output pixel data that represents the output image, one or more pieces of output pixel data corresponding to one or more pieces of input pixel data classified as the high-frequency region data, by using the super resolution process data of the one or more pieces of input pixel data as the one or more pieces of output pixel data based on an amount of noise included in the one or more pieces of input pixel data;
    wherein when an amount of noise included in a piece of input pixel data classified as the high-frequency region data is smaller than or equal to a predetermined threshold, the generating unit outputs a piece of super resolution process data corresponding to the piece of input pixel data without change as a piece of output pixel data corresponding to the piece of input pixel data and
    wherein when an amount of noise included in the piece of input pixel data classified as the high-frequency region data is larger than the predetermined threshold, the generating unit outputs data other than the piece of super resolution process data corresponding to the piece of input pixel data as the piece of output pixel data corresponding to the piece of input pixel data.

2. The image processing device of claim 1, wherein the region determining unit assigns a label to each of the input pixel data that differs depending on whether the input pixel data is classified into the high-frequency region data or the non-high-frequency region data.

3. The image processing device of claim 1 further comprising
    a filter processing unit configured to generate filter process data by applying a filter process to the plurality of pieces of input pixel data,
    the generating unit including
    a first mixing unit configured to generate one or more pieces of first mixture data by mixing the super resolution process data with the filter process data in accordance with the amounts of noise of the one or more pieces of input pixel data,
    wherein, as the data other than the piece of super resolution process data corresponding to the piece of input pixel data, the generating unit outputs the one or more pieces of first mixture data as the one or more pieces of output pixel data.

4. The image processing device of claim 3, wherein the first mixing unit calculates a mixture ratio $\alpha: (1-\alpha)$ satisfying $0 \leq \alpha \leq 1$ such that a value of $\alpha$ increases as the amount of noise increases, and generates the one or more pieces of first mixture data by mixing the filter process data with the super resolution process data in accordance with the mixture ratio $\alpha: (1-\alpha)$.

5. The image processing device of claim 3, wherein the generating unit further includes
    a second mixing unit configured to generate one or more pieces of second mixture data by mixing the one or more pieces of input pixel data with the one or more pieces of first mixture data in accordance with a predetermined mixture ratio, and
    the generating unit outputs the one or more pieces of second mixture data instead of the one or more pieces of first mixture data.

6. An image processing method for generating an output image by performing an image process on an input image, the image processing method comprising the steps of:
    generating super resolution process data by performing a super resolution process on a plurality of pieces of input pixel data that represent the input image;
    classifying each of the plurality of pieces of input pixel data into one of high-frequency region data and non-high-frequency region data; and
    generating, as at least part of output pixel data that represents the output image, one or more pieces of output pixel data corresponding to one or more pieces of input pixel data classified as the high-frequency region data, by using the super resolution process data of the one or more pieces of input pixel data as the one or more pieces of output pixel data based on an amount of noise included in the one or more pieces of input pixel data;
    wherein when an amount of noise included in a piece of input pixel data classified as the high-frequency region data is smaller than or equal to a predetermined threshold, said generating outputs a piece of super resolution process data corresponding to the piece of input pixel data without change as a piece of output pixel data corresponding to the piece of input pixel data; and wherein when an amount of noise included in the piece of input pixel data classified as the high-frequency region data is larger than the predetermined threshold, said generating outputs data other than the piece of super resolution process data corresponding to the piece of input pixel data as the piece of output pixel data corresponding to the piece of input pixel data.

7. An integrated circuit for use in an image processing device for generating an output image by performing an image process on an input image, the integrated circuit comprising:
  a super resolution processing unit configured to generate super resolution process data by performing a super resolution process on a plurality of pieces of input pixel data that represent the input image;
  a region determining unit configured to classify each of the plurality of pieces of input pixel data into one of high-frequency region data and non-high-frequency region data; and
  a generating unit configured to generate, as at least part of output pixel data that represents the output image, one or more pieces of output pixel data corresponding to one or more pieces of input pixel data classified as the high-frequency region data, by using the super resolution process data of the one or more pieces of input pixel data as the one or more pieces of output pixel data based on an amount of noise included in the one or more pieces of input pixel data;
  wherein when an amount of noise included in a piece of input pixel data classified as the high-frequency region data is smaller than or equal to a predetermined threshold, the generating unit outputs a piece of super resolution process data corresponding to the piece of input pixel data without change as a piece of output pixel data corresponding to the piece of input pixel data; and
  wherein when an amount of noise included in the piece of input pixel data classified as the high-frequency region data is larger than the predetermined threshold, the generating unit outputs data other than the piece of super resolution process data corresponding to the piece of input pixel data as the piece of output pixel data corresponding to the piece of input pixel data.

8. A program that is recorded on a computer-readable non-transitory recording medium and executes an image process, the image process comprising the steps of:
  generating super resolution process data by performing a super resolution process on a plurality of pieces of input pixel data that represent the input image;
  classifying each of the plurality of pieces of input pixel data into one of high-frequency region data and non-high-frequency region data; and
  generating, as at least part of output pixel data that represents the output image, one or more pieces of output pixel data corresponding to one or more pieces of input pixel data classified as the high-frequency region data, by using the super resolution process data of the one or more pieces of input pixel data as the one or more pieces of output pixel data based on an amount of noise included in the one or more pieces of input pixel data;
  wherein when an amount of noise included in a piece of input pixel data classified as the high-frequency region data is smaller than or equal to a predetermined threshold, said generating outputs a piece of super resolution process data corresponding to the piece of input pixel data without change as a piece of output pixel data corresponding to the piece of input pixel data; and
  wherein when an amount of noise included in the piece of input pixel data classified as the high-frequency region data is larger than the predetermined threshold, said generating outputs data other than the piece of super resolution process data corresponding to the piece of input pixel data as the piece of output pixel data corresponding to the piece of input pixel data.

* * * * *